(12) United States Patent
Naritomi et al.

(10) Patent No.: US 6,891,295 B2
(45) Date of Patent: May 10, 2005

(54) FLYWHEEL MAGNETO GENERATOR

(75) Inventors: Ken Naritomi, Numazu (JP); Masaaki Kubo, Numazu (JP); Tooru Notsu, Numazu (JP); Masakazu Inaba, Numazu (JP); Junji Kimura, Numazu (JP); Takeshi Watanabe, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/820,606

(22) Filed: Apr. 8, 2004

(65) Prior Publication Data
US 2004/0201299 A1 Oct. 14, 2004

(30) Foreign Application Priority Data

Apr. 9, 2003 (JP) .......................................... 2003-104824
Mar. 30, 2004 (JP) .......................................... 2004-097848

(51) Int. Cl.[7] .............................................. H02K 21/22
(52) U.S. Cl. .................... 310/153; 310/156.12
(58) Field of Search ............... 310/153, 156.01–156.84; 123/149 D, 149 R; H02K 21/22

(56) References Cited

U.S. PATENT DOCUMENTS 3,948,239 A * 4/1976 Katsumata ............. 123/406.57
4,482,831 A * 11/1984 Notaras et al. ......... 310/156.59
4,606,305 A * 8/1986 Campen ................ 123/149 D

FOREIGN PATENT DOCUMENTS

| JP | 08-080020 | | 3/1996 | |
|---|---|---|---|---|
| JP | 2001025223 A | * | 1/2001 | .......... H02K/21/22 |
| JP | 2001061263 | * | 3/2001 | .......... H02K/21/22 |
| JP | 2001-095216 | | 4/2001 | |

* cited by examiner

Primary Examiner—Darren Schuberg
Assistant Examiner—Nguyen Hanh
(74) Attorney, Agent, or Firm—Pearne & Gordon LLP

(57) ABSTRACT

A flywheel magneto generator which comprises a rotor having a magnet attached to an outer circumferential side of a flywheel and a stator constructed by winding a generating coil around a core having a magnetic pole portion opposed to a magnetic pole of the rotor, wherein a through hole is formed in a peripheral wall portion of the flywheel, a yoke plate is provided so as to block one end of the through hole which is opened on an inner circumferential side of a peripheral wall portion of the flywheel, the magnet to which a magnet cover is attached is supported on the yoke plate, and one magnetic pole face of the magnet is opposed to the yoke plate.

7 Claims, 4 Drawing Sheets

FLYWHEEL MAGNETO GENERATOR

TECHNICAL FIELD OF THE INVENTION

The present invention relates to a flywheel magneto generator suitable for mounting on an internal combustion engine.

BACKGROUND OF THE INVENTION

There has been widely used as a generator for an internal combustion engine a magneto generator which comprises a magneto rotor, which has a cylindrical flywheel and a magnet attached to an outer circumferential side of a peripheral wall portion of the flywheel, and a stator, which is constructed by winding a generating coil around a core having a magnetic pole portion opposed to the outer circumference of the peripheral wall portion of the flywheel and a magnetic pole of a permanent magnet via a predetermined gap.

In a magneto generator of this kind, in which a flywheel is made of a casting, as shown in the Japanese Patent Application Laid-Open No. 8-80020, a magneto rotor was constructed by attaching a magnet to a recessed portion formed in an outer circumference of a peripheral wall portion of the flywheel.

However, in a case where a flywheel made by the press forming of a steel sheet is used, because the sheet thickness of the peripheral wall portion of the flywheel is small, it was difficult to form, with good accuracy, a recessed portion having a depth capable of housing the magnet in the outer circumference of the peripheral wall portion in order to attach the magnet to the interior of the recessed portion.

Therefore, when a press formed flywheel is used, as described in the Japanese Patent Application Laid-Open No. 2001-95216, it is general practice to construct a magneto rotor by bonding one magnetic pole face of a magnet on an outer circumferential surface of a peripheral wall portion of the flywheel.

However, when a magnet is bonded to an outer circumferential surface of a peripheral wall portion of the flywheel, the magnet is protruded to the outside from the outer circumferential surface of the peripheral wall portion of the flywheel and, therefore, in assembling a magneto generator, the magnetic pole of the stator abuts against the magnet or a tool abuts against the magnet, which occurs the problem that the magnet is apt to be broken.

Furthermore, as disclosed in the Japanese Patent Application Laid-Open No. 2001-95216, in a case where a magnet is bonded to an outer circumference of a peripheral portion of the flywheel, there was a problem that it is not easy to position the magnet until an adhesive hardens.

SUMMARY OF THE INVENTION

Therefore, an object of the present invention is to enable that in a flywheel magneto generator in which a magnet is provided on an outer circumferential side of a peripheral wall portion of a press formed flywheel, the magnet can be mounted without protruding the magnet from the outer circumferential surface of the peripheral wall portion of the flywheel.

Another object of the present invention is to enable that, in a flywheel magneto generator in which a magnet is provided on an outer circumferential side of a peripheral wall portion of a press formed flywheel, positioning of mounting the magnet can be easily performed.

The present invention is applied to a flywheel magneto generator, which comprises: a magneto rotor, which has a press formed cylindrical flywheel and a magnet fixed to an outer circumferential side of a peripheral wall portion of the flywheel; and a stator, which is constructed by winding a generating coil around a core having a magnetic pole portion opposed to the outer circumference of the peripheral wall portion of the flywheel and a magnetic pole of a permanent magnet via a predetermined gap.

In an aspect of the present invention, there is provided a through hole which pierces through the peripheral wall portion of the flywheel in a radial direction of the peripheral wall portion, and a yoke plate provided so as to block one end of the through hole opened on an inner circumferential side of the peripheral wall portion of the flywheel is arranged on a inner circumferential side of the peripheral wall portion. The magnet is arranged within the through hole, and is supported on the yoke plate, one magnetic pole face of the magnet being opposed to the yoke plate.

Because the formation of a through hole in a peripheral wall portion of a flywheel can be performed with high accuracy, by providing a through hole in a peripheral wall portion of a flywheel as described above and by supporting the magnet on the yoke plate provided so as to block one end of the through hole opened on an inner circumferential side of the peripheral wall portion of the flywheel, it is possible to perform the mounting of the magnet with high accuracy without protruding the magnet from the outer circumferential surface of the flywheel.

In a preferred aspect of the present invention, there is provided a magnet cover, which integrally comprises a cup-shaped cover main-body arranged so as to cover the magnet, a skirt-like magnet positioning portion which is provided so as to protrude to the outside from a hem portion of the cover main-body and whose outer circumferential portion is fitted over an inner circumference of the through hole, and a flanged plate portion which is provided so as to extend in a manner protruding to the outside from an outer circumferential portion of the magnet positioning portion and which is sandwiched between the yoke plate and the peripheral wall portion of the flywheel on the side of one end of the through hole.

The providing of such a magnet cover not only enables the magnet to be protected, but also permits the positioning of the magnet owing to the fitting of the magnet positioning portion of the magnet cover over the inner circumference of the through hole, with the result that the positioning of the magnet becomes easy.

Furthermore, when such a magnet cover as described above is provided, a flanged plate portion of the magnet cover is sandwiched between the yoke plate and the peripheral wall portion of the flywheel and, therefore, it is possible to prevent the falling-off of the magnet and the magnet cover due to centrifugal force.

In another preferred aspect of the present invention, there is provided a through hole which pierces through the peripheral wall portion of the flywheel in a radial direction, and an area surrounding the through hole of the peripheral wall portion is recessed to an inner side of the radial direction, with the result that a magnet housing recessed portion is formed in the peripheral wall portion. The magnet is housed in the magnet housing recessed portion, and one magnetic pole face of the magnet is bonded to a bottom portion of the magnet housing recessed portion.

By providing a through hole in the peripheral wall portion of the flywheel and forming a magnet housing recessed portion by recessing an area surrounding the through hole as described above, it is possible to release part of the metal constituting the peripheral wall portion of the flywheel in forming the magnet housing recessed portion and, therefore, it is possible to perform the formation of the magnet housing recessed portion with high accuracy.

As described above, also in a case where the magnet is fixed within the magnet housing recessed portion, in order to ensure the protection of the magnet and facilitate the positioning of the magnet, it is desirable to mount a magnet cover which integrally comprises a cup-shaped cover main-body arranged so as to cover the magnet, and a skirt-like magnet positioning portion which is provided so as to protrude to the outside from a hem portion of the cover main-body and whose outer circumferential portion is fitted over an inner circumference of the magnet housing recessed portion.

BRIEF DESCRIPTION OF THE DRAWINGS

The above and other objects and features of the present invention will be apparent from the detailed description of the preferred embodiments of the invention, which is described and illustrated with reference to the accompanying drawings, in which.

DETAILED DESCRIPTION OF THE PREFERRED EMBODIMENTS

Now, embodiments of the invention will be described with reference to the drawings.

Figure 1:
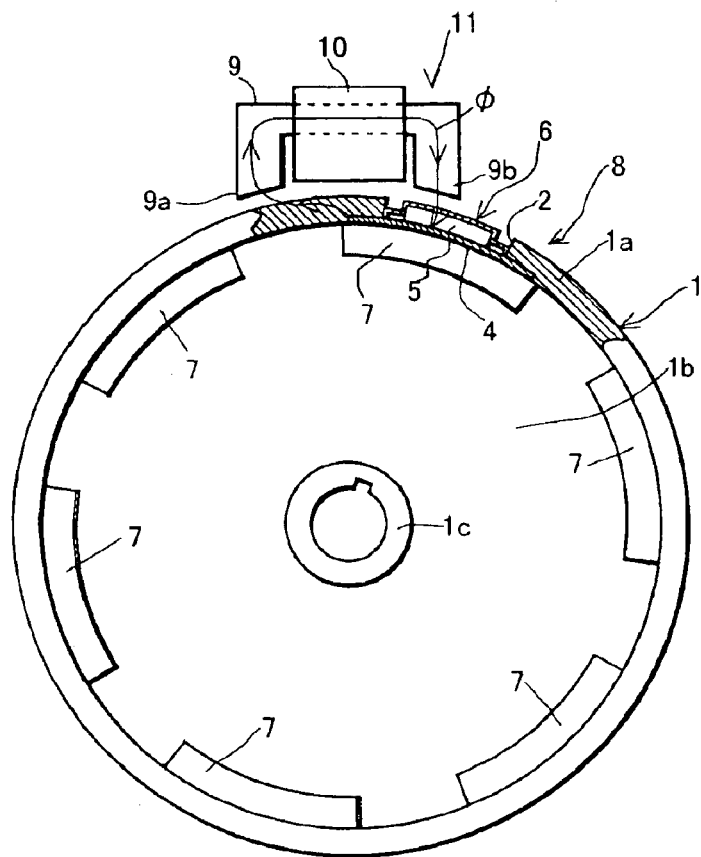
FIG. 1 is a front view of the first embodiment of the present invention with part thereof shown as a sectional view.

FIG. 1 is a front view, partially in section, of the construction of the first embodiment of the present invention. In this figure, a reference numeral 1 denotes a flywheel formed by the press forming of a steel sheet. The flywheel 1 is formed in a cylindrical shape having a peripheral wall portion 1a and a bottom wall portion 1b which closes one end of this peripheral wall portion in the direction of the axis line thereof. A boss portion 1c is formed at the center of the bottom wall portion of the flywheel and attached to a crankshaft of an internal combustion engine which is not shown in the figure.

As shown in FIG. 1 to FIG. 4, a through hole 2 is formed so as to pierce through a part of the peripheral wall portion 1a of the flywheel 1 in the radial direction of the flywheel.

Figure 2:
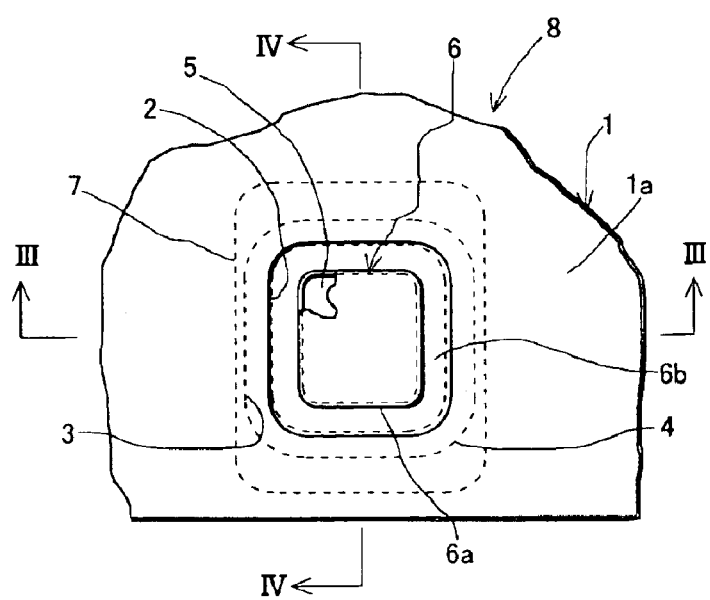
FIG. 2 is a plan view of part of a rotor used in the first embodiment of the present invention.

As shown in FIG. 2, the through hole 2 has a contour of a square with rounded corners.

An annular recessed portion 3 having a sectional shape similar to the sectional shape of the through hole 2 is formed by recessing an area surrounding the through hole 2 of an inner circumferential surface of the peripheral wall portion 1a of the flywheel toward the outside circumferential surface of the flywheel, and a yoke plate 4 is fitted into this annular recessed portion 3. The yoke plate 4, which is made of a ferromagnetic material such as iron, has a contour which is fitted into the recessed portion 3 without a gap and is bent with the same curvature as that of the inner circumferential surface of the peripheral wall portion 1a along the circumferential direction of the peripheral wall portion 1a of the flywheel.

A reference numeral 5 denotes a magnet. This magnet is arranged within the through hole 2 and one magnetic pole face of the magnet is opposed to the yoke plate 4. In order to minimize the thickness of the magnet 5, it is desirable to use a rare earth magnet as the magnet 5.

A magnet cover 6 made of a nonmagnetic material such as stainless steel is provided in order to ensure the positioning and protection of the magnet 6. The magnet cover 5 integrally comprises a cup-shaped cover main-body 6a arranged so as to cover the magnet 5, a skirt-like magnet positioning portion 6b which is provided so as to protrude to the outside from a hem portion of the cover main-body 6a and whose outer circumferential portion is fitted over an inner circumference of the through hole, and a flanged plate portion 6c which is provided so as to extend in a manner protruding to the outside from an outer circumferential portion of the magnet positioning portion 6b and which is sandwiched between the yoke plate 4 and the peripheral wall portion 1a of the flywheel on the side of one end of the through hole 2. In the illustrated example, the flanged plate portion 6c of the magnet cover 6, along with the yoke plate 4, is fitted into the recessed portion 3. The flanged plate portion 6c is arranged within the recessed portion 3, and is sandwiched between the yoke plate 4 and the peripheral wall portion of the flywheel.

Also in the illustrated example, permanent magnets 7, 7, . . . are fixed to the inner circumference of the peripheral wall portion 1a of the flywheel by bonding and the like, and a rotor 8 is comprised of the flywheel 1, the yoke plate 4, the magnet 5, the magnet cover 6 and the magnet 7.

In assembling the above-described rotor 8, the cover main-body 6a of the magnet cover 6 is first putted on the magnet 5 to cover the same. Subsequently, the magnet 5, along with the magnet cover 6, is inserted into the through hole 2 from the inner circumferential side of the peripheral wall portion of the flywheel, the outer circumferential portion of the magnet positioning portion 6b of the magnet cover 6 is fitted over the inner circumference of the through hole 2, and the flanged plate portion 6c is fitted into the recessed portion 3. As a result of this, the magnet 5 is positioned in the through hole 2. Subsequently, the yoke plate 4 is fitted into the recessed portion 3, and one magnetic pole face of the magnet 5 is opposed to the yoke plate 4.

Because the yoke plate 4 is attracted onto the magnet 5, an assembly which is comprised of the magnet 5, the magnet cover 6 and the yoke plate 4 is held by the peripheral wall portion of the flywheel without separation.

Although basically, the above-described assembly can be held by the peripheral wall portion of the flywheel without using an adhesive, it is possible to bond the yoke plate 4 and the magnet 5 together or to bond the yoke plate 4 to the recessed portion 3 and the flanged plate portion 6c of the magnet cover as required. Furthermore, the magnet cover 6 may be bonded to the inner circumferential surface of the through hole 2.

When the magnet 7 is attached by bonding to the inner circumferential side of the peripheral wall portion of the flywheel as shown in the illustrated example, by aligning the position of one magnet 7 with the position of the magnet 5 as shown in the figures, it is possible to simultaneously bond the yoke plate 4 to the peripheral wall portion of the flywheel when bonding the magnet 7 and, therefore, it is unnecessary to perform bonding separately when the assembly which is comprised of the magnet 5, the magnet cover 6 and the yoke plate 4 is attached to the peripheral wall portion of the flywheel.

Outside the rotor 8, it is arranged a stator 11 which is constructed by winding a generating coil 10 around a U-shaped core 9 having magnetic pole portions 9a, 9b opposed to the outer circumference of the peripheral wall portion of the flywheel and the magnetic pole of the magnet via a gap. This stator is fixed to a stator mounting portion provided, for example, in a case of an internal combustion engine, and the magnetic pole portions 9a, 9b of the core are opposed to the outer circumference of the flywheel. The illustrated generating coil 10, which comprises a primary coil and a secondary coil whose number of windings is larger than that of the primary coil, is used as an ignition coil of an ignition device for an internal combustion engine.

A flywheel magneto generator related to the present invention is comprised of the stator 11 and the rotor 8. In this flywheel magneto generator, as shown in FIG. 1, a magnetic flux $\phi$ flows through the channel of magnet 5—rotor yoke 4—peripheral wall portion 1a of flywheel—core 9—magnet 5, and a voltage is induced in the generating coil alternation of a magnetic flux $\phi$ generated in association with the rotation of the rotor 8.

In the illustrated example, a plurality of magnets 7, 7, . . . are mounted on the inner circumferential side of the peripheral wall portion of the flywheel. These magnets 7, along with armatures (not shown) arranged on an inner side of the flywheel 1, are provided in order to constitute another magneto generator. The magnets 7, 7, . . . are omitted when armatures are not arranged on the inner side of the flywheel.

Figure 3:
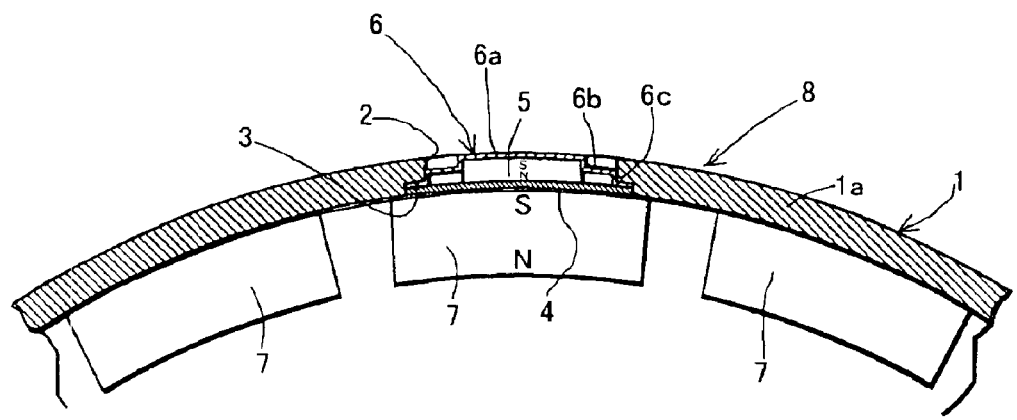
FIG. 3 is a sectional view taken along the line III—III of FIG. 2.
Figure 4:
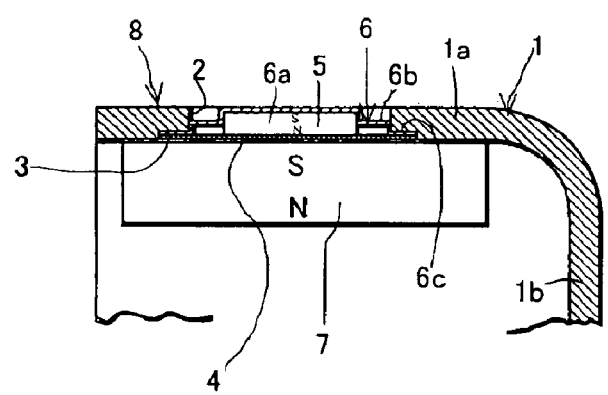
FIG. 4 is a sectional view taken along the line IV—IV of FIG. 2.

When the magnet 7 is mounted on the inner circumference of the peripheral wall portion of the flywheel, as shown in FIG. 3 and FIG. 4, it is preferred that, with the center of one magnet 7 aligned with the center of the magnet 5, the magnet 7 is magnetized in such a manner that the magnetic pole on the outer circumferential side of the magnet 7 is different from the magnetic pole on the inner circumferential side of the magnet 5. That is, it is preferred that the magnetic poles of the magnet 5 and the magnet 7 which are adjacent via the yoke plate 4 have different polarities.

In the above-described embodiment, the annular recessed portion 3 is formed around one end of the through hole 2 opened on the inner peripheral side of the peripheral wall portion of the flywheel, and the yoke plate 4 is housed in this annular recessed portion 3. However, the recessed portion 3 can be omitted when it is unnecessary to mount the magnet 7 on the inner circumferential surface of the flywheel where the yoke plate 4 is arranged.

Although in the above-described example, the yoke plate 4 is provided separately from the flywheel 1, it is also possible that a portion corresponding to the yoke plate 4 is integrally provided in the flywheel.

Figure 5:
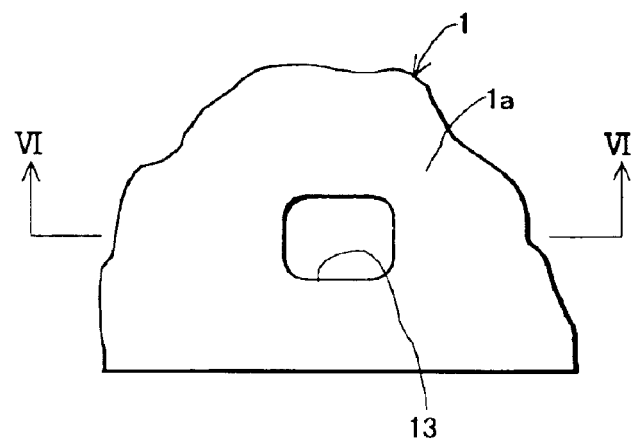
FIG. 5 is a plan view of a through hole provided in a peripheral wall of a flywheel in the process of manufacturing a rotor used in the second embodiment of the present invention.
Figure 6:
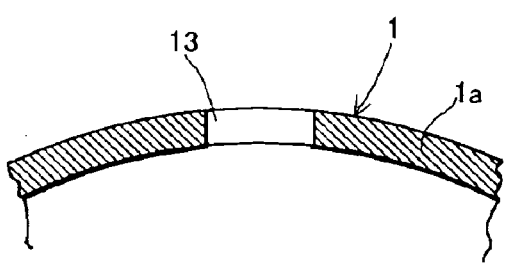
FIG. 6 is a sectional view taken along the line VI—VI of FIG. 5.
Figure 7:
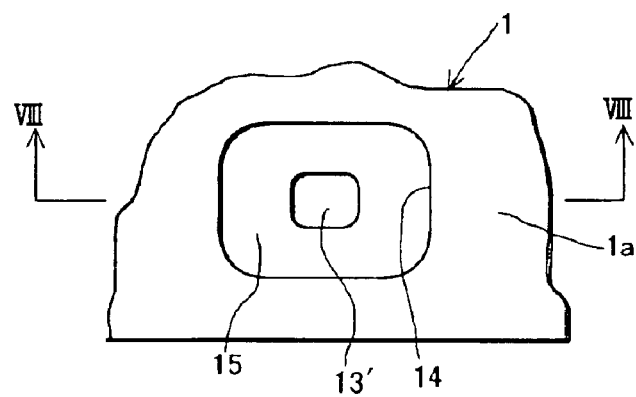
FIG. 7 is a partial plan view of a flywheel used in the second embodiment of the present invention.
Figure 8:
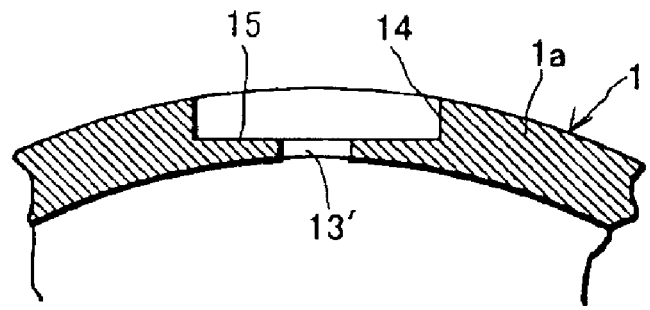
FIG. 8 is a sectional view taken along the line VIII—VIII of FIG. 7.

FIG. 5 to FIG. 9 shows the second embodiment of the present invention, in which a portion corresponding to the yoke plate 4 is integrally provided in the flywheel. In this embodiment, first, as shown in FIG. 5 and FIG. 6, in a predetermined place of a peripheral wall portion 1a of a flywheel 1, there is formed a through hole 13 which pierces through the peripheral wall portion in the radial direction. Subsequently, by press forming an area surrounding the through hole 13 of the peripheral wall portion 1a of the flywheel 1 so that this area is recessed from the outer side to the inner side of the radial direction of the peripheral wall portion, a magnet housing recessed portion 14 opened on the outer circumference of the peripheral wall portion is formed in the peripheral wall portion of the flywheel as shown in FIG. 7 and FIG. 8.

As shown in the drawings, by forming the through hole 13 in the peripheral wall portion of the flywheel and then recessing an area surrounding the through hole to form the magnet housing recessed portion 14, it is possible to flow part of the metal composing the peripheral wall portion of the flywheel to the inside of the through hole 13 in the process of forming this recessed portion 14. Therefore, it is possible to form the recessed portion 14 with high accuracy without producing the problem that excess metal bulges on the outer circumferential side of the peripheral wall portion 1a of the flywheel causes the deformation of the peripheral wall portion around the recessed portion 14 and other problems. When the magnet housing recessed portion 14 has been formed, a through whole 13' having a contracted diameter remains at the center of a bottom portion 15 of the recessed portion 14.

Figure 9:
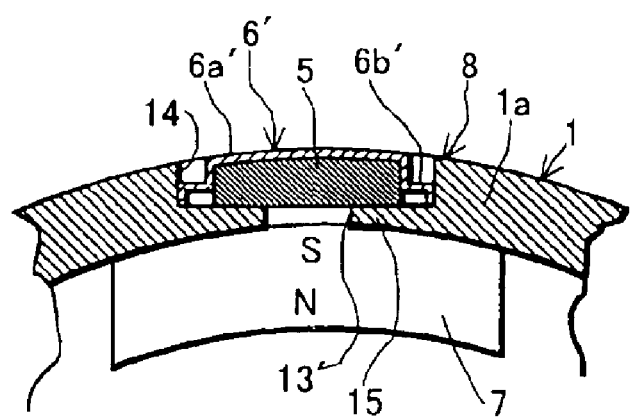
FIG. 9 is a partial sectional view of a rotor used in the second embodiment of the present invention.

In order to ensure the positioning of the magnet 5 and the protection of the magnet 5, as shown in FIG. 9, there is provided a magnet cover 6' integrally comprises a cup-shaped cover main-body 6a' arranged so as to cover the magnet 5 and a skirt-like magnet positioning portion 6b' which is provided so as to protrude to the outside from a hem portion of the cover main-body and whose outer circumferential portion is fitted over an inner circumference of the magnet housing recessed portion 14. The magnet cover 6' is made of a nonmagnetic material such as stainless steel.

After the mounting of the magnet cover 6' on the magnet 5, as shown in FIG. 9, the magnet 5, along with the magnet cover 6', is inserted into the magnet housing recessed portion 14 and bonded to the bottom portion 15 of the magnet housing recessed portion 14, with one magnetic pole face of the magnet 5 opposed to the bottom portion 15. The magnet 5 is positioned by the fitting of the magnet positioning portion 6b' of the magnet cover 6' over the inner circumference of the recessed portion 14.

A rotor 8 is comprised of the flywheel 1, the magnet 5 and the magnet cover 6', and a flywheel magneto generator is comprised of this rotor and a stator similar to the stator 11 shown in FIG. 1.

Also in the example shown in FIG. 9, the magnet 7 is mounted on the inner circumference of the peripheral wall portion 1a of the flywheel 1. The magnet 7 is omitted when an armatures is not arranged on the inner side of the flywheel.

As described above, in manufacturing the rotor 8 for a magneto generator having the press formed cylindrical flywheel 1 and the magnet 5 fixed on the outer circumferential side of the peripheral wall portion of the flywheel, it is possible to form the magnet housing recessed portion 14 with high accuracy on the outer circumferential side of the peripheral wall portion of the flywheel without deforming the peripheral wall portion of the flywheel and to obtain a rotor for a magneto generator having a structure housing the magnet within the recessed portion by performing the process of providing the through hole 13 which pierces through the peripheral wall portion in the radial direction on the peripheral wall portion of the flywheel 1, the process of press forming an area surrounding the through hole 13 in the peripheral wall portion of the flywheel 1 so that this area is recessed from the outer side to the inner side of the radial direction of the peripheral wall portion, and the process of placing the magnet 5 on the bottom portion 15 of the magnet housing recessed portion 14 and bonding one magnetic pole face of the magnet to the bottom portion of the magnet housing recessed portion.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A flywheel magneto generator, comprising:

a magneto rotor, which has a press formed cylindrical flywheel and a magnet fixed to an outer circumferential side of a peripheral wall portion of the flywheel; and a stator, which is constructed by winding a generating coil around a core having a magnetic pole portion opposed to the outer circumference of the peripheral wall portion of the flywheel and a magnetic pole of said magnet via a gap;

wherein there is provided a through hole which pierces through said peripheral wall portion of said flywheel in a radial direction of the peripheral wall portion, a yoke plate provided so as to block one end of said through hole opened on an inner circumferential side of the peripheral wall portion of said flywheel is arranged on a inner circumferential side of said peripheral wall portion, and said magnet is arranged within said through hole, and is supported on said yoke plate, one magnetic pole face of said magnet being opposed to said yoke plate.

2. The flywheel magneto generator according to claim 1, wherein said generating coil is an ignition coil used in an ignition device for an internal combustion engine.

3. The flywheel magneto generator according to claim 1, wherein there is provided a magnet cover, which integrally comprises a cup-shaped cover main-body arranged so as to cover said magnet, a skirt-like magnet positioning portion which is provided so as to protrude to the outside from a hem portion of the cover main-body and whose outer circumferential portion is fitted over an inner circumference of said through hole, and a flanged plate portion which is provided so as to extend in a manner protruding to the outside from an outer circumferential portion of said magnet positioning portion and which is sandwiched between said yoke plate and the peripheral wall portion of said flywheel on the side of the end of said through hole.

4. The flywheel magneto generator according to claim 3, wherein an area surrounding said through hole of an inner circumferential surface of said peripheral wall portion is recessed on an outside diameter side of said flywheel so as to form an annular recessed portion for fitting said yoke plate, said yoke plate being positioned by being fitted into said annular recessed portion.

5. The flywheel magneto generator according to claim 4, wherein there is provided a magnet cover, which integrally comprises a cup-shaped cover main-body arranged so as to cover said magnet, a skirt-like magnet positioning portion which is provided so as to protrude to the outside from a hem portion of the cover main-body and whose outer circumferential portion is fitted over an inner circumference of said through hole, and a flanged plate portion which is provided so as to extend in a manner protruding to the outside from an outer circumferential portion of said magnet positioning portion and which is sandwiched between said yoke plate and the peripheral wall portion of said flywheel within said annular recessed portion.

6. The flywheel magneto generator according to claim 5, wherein said generating coil is an ignition coil used in an ignition device for an internal combustion engine.

7. A flywheel magneto generator, comprising:

a magneto rotor, which has a press formed cylindrical flywheel and a magnet fixed to an outer circumferential side of a peripheral wall portion of the flywheel; and a stator, which is constructed by winding a generating coil around a core having a magnetic pole portion opposed to the outer circumference of the peripheral wall portion of the flywheel and a magnetic pole of said magnet via a gap;

wherein there is provided a through hole which pierces through said peripheral wall portion of said flywheel in a radial direction of the peripheral wall portion, and an area surrounding said through hole of said peripheral wall portion is recessed to an inner side of said radial direction, whereby a magnet housing recessed portion is formed in said peripheral wall portion, and said magnet is housed in said magnet housing recessed portion, one magnetic pole face thereof being bonded to a bottom portion of said magnet housing recessed portion; and a magnet cover, which integrally comprises a cup-shaped cover main-body arranged so as to cover said magnet, a skirt-like magnet positioning portion which is provided so as to protrude to the outside from a hem portion of the cover main-body and whose outer circumferential portion is fitted over an inner circumference of said magnet housing recessed portion.

* * * * *